United States Patent [19]

Chamuel

[11] 4,121,155
[45] Oct. 17, 1978

[54] POSITION READOUT DEVICE

[75] Inventor: Jacques R. Chamuel, Allston, Mass.

[73] Assignee: The Charles Stark Draper Laboratory, Inc., Cambridge, Mass.

[21] Appl. No.: 747,072

[22] Filed: Dec. 2, 1976

[51] Int. Cl.² ............................................ G01R 33/00
[52] U.S. Cl. ................................................... 324/207
[58] Field of Search ............... 324/34 PS, 34 D, 34 L, 324/34 MA, 206, 207, 208; 340/15, 16 R, 16 P, 195; 33/1 M, 125 W

[56] References Cited

U.S. PATENT DOCUMENTS

| | | | |
|---|---|---|---|
| 3,121,955 | 2/1964 | King | 340/5 S X |
| 3,365,799 | 1/1968 | Fisher | 33/125 W X |
| 3,423,673 | 1/1969 | Bailey et al. | 324/34 R |
| 3,626,397 | 12/1971 | Uemura | 324/34 D X |
| 3,873,912 | 3/1975 | Mori et al. | 324/34 L |
| 4,028,619 | 6/1977 | Edwards | 324/34 PS |

Primary Examiner—T.H. Tubbesing
Assistant Examiner—T. M. Blum

Attorney, Agent, or Firm—Robert F. O'Connell

[57] ABSTRACT

A position determining system in which a delay element has at least one driver transducer at at least one position and at least one receiver transducer at at least one other position, the transducers being arranged so that a traveling wave signal at the driver transducer travels along the delay element from the first said at least one position to said at least one other position so that a distance which is to be measured is traversed more than once. Certain embodiments accomplish such operation by providing a "folded" or U-shaped delay element, the driver and receiver being located on separate legs thereof so that the traveling wave traverses both legs of the delay element so that the distance which is to be measured is traversed twice, thereby increasing the resolution of the overall device. In another embodiment, for example, a pulse is triggered a plurality of times at at least one driver transducer means so that it traverses the distance from the at least one driver transducer means to at least one receiver transducer means a plurality of times.

36 Claims, 17 Drawing Figures

POSITION READOUT DEVICE

INTRODUCTION

This invention relates generally to position sensing and readout devices for determining the relative position of two relatively movable members and, more particularly, to such devices in which the movable members are not required to make physical contact with each other and which does not require power to be supplied to one of the two movable members, such devices providing increased resolution over prior known devices of such type.

BACKGROUND OF THE INVENTION

In my previously filed co-pending application, Ser. No. 520,742, filed Nov. 4, 1974, now U.S. Pat. No. 4,035,762, issued July 12, 1977, incorporated herein by reference, I discussed the desirability of providing relatively simple means for measuring a position along a line, either straight or curved, or on a plane or other curvilinear surface, with a high degree of accuracy at a reasonable cost. Such application discussed various techniques of the prior art for performing such position determinations and further described a variety of inventive techniques for providing such position determinations which techniques represented improvements over the prior art discussed therein.

The embodiments described therein require two relatively movable members. In a particular embodiment, for example, one member may comprise a driver transducer and a delay line both fixedly positioned and a second member may comprise a receiver transducer which is movable with respect to the fixed driver transducer and delay line. In such an embodiment, power is required to be supplied to both members so that suitable brushes are required for such purposes. Further, the resolution of the displacement measurement depends upon the phase shift experienced by a continuous elastic wave traveling once along a single delay line element in one direction only parallel to the distance to be measured.

It is desirable to provide a position sensing device in which power is not required to be supplied to both members (so that the need for brushes can be eliminated) and in which the resolution is improved over that of the previously described devices.

SUMMARY OF THE INVENTION

In improving the resolution of some of the devices disclosed in my previously filed application, this invention utilizes a technique which provides substantially twice the resolution of such devices and which, in its preferred form, provides both a contactless configuration, wherein the driver and receiver transducers used in conjunction with the delay line element can perform their functions without contacting the delay element in any way, and also a configuration which eliminates the need for supplying power to one of the relatively movable members which supports the delay line.

In accordance with an embodiment of the present invention the delay element, which in a preferred embodiment is of a magnetostrictive type, is formed in a generally U-shaped configuration, one leg of the U-shaped delay element being positioned adjacent a driver transducer and the other leg thereof being positioned adjacent a receiver transducer, the transducers being appropriately supported on a first movable member which moves with respect to a second fixed member, i.e., a fixedly positioned delay element. When a relative motion occurs between the delay element and the driver and receiver, which are moved simultaneously in the same direction, the received signal becomes delayed by twice the time delay which occurs in those embodiments of the devices described in my previous application which utilize a non U-shaped delay line element. Accordingly, each unit of displacement created by such relative motion creates twice the phase shift obtained when using non U-shaped, straight line devices and the resolution of the overall structure is effectively doubled. Moreover, since power is applied only to one of the relatively movable members, i.e., to the two transducers mounted thereon for simultaneous movement in the same direction along the legs of the U-shaped delay line, no power is required to be supplied to the other member and the need for brushes is eliminated. The principles of the invention are useful in many different embodiments, many exemplary ones of which are described herein.

DESCRIPTION OF THE INVENTION

Figure 1:
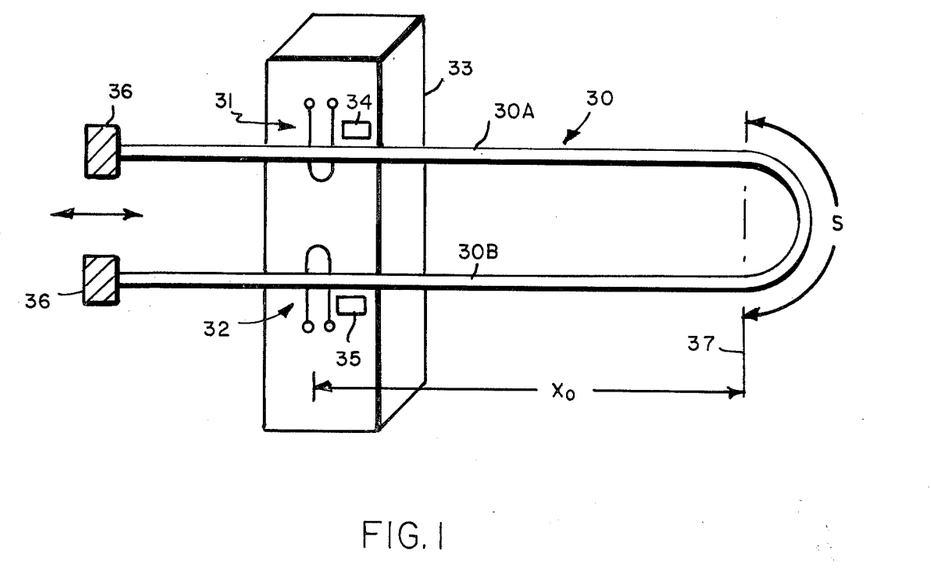
FIG. 1 shows one exemplary embodiment of the invention.

FIG. 1 shows one embodiment of the present invention wherein a magnetostrictive delay line element 30 is fabricated in a substantially U-shaped configuration (in effect a "folded" delay line), the delay element, for example, being fixedly mounted by appropriate means relative to a pair of transducers 31 and 32 movable relative to the delay element along the x-direction, as shown, the transducers being fixedly supported to an appropriate movable support member 33. A first driver transducer 31 may be in the form of a wire loop which is positioned adjacent, but not necessarily in contact with, a first leg 30A of the delay element 30. A second receiver transducer 32 is appropriately mounted adjacent, but not necessarily in contact with, a second leg 30B of delay element 30. Receiver transducer 32 may also be of the same wire loop form as driver transducer 31. Appropriate magnets 34 and 35 (or other appropriate magnetic biasing means) are also mounted on mounting member 33 adjacent the driver and receiver transducers. The free ends of the U-shaped delay element 30 are suitably mounted in termination blocks 36 which are fabricated so as to provide a means for absorbing elastic waves which impinge thereon. The material of such mounting blocks, for example, may be clamped rubber, or other similar elastomer materials for such purpose. Thus, elastic waves which impinge thereon are effectively damped out so that substantially no reflections thereof occur at such terminations.

The structure of FIG. 1 permits a measurement of the distance $X_0$ from the transducers to a selected reference line 37, for example, at a position just prior to the end, or bight, of the U-shaped delay element 30, as shown. A relative motion occurs between the delay element and the transducers, in this case the transducers being specifically mounted on a movable mounting member while the delay element is fixedly positioned. In some applications it may be desirable to movably mount the delay element and to fixedly position the transducers, or to move both relative to each other.

While the driver and receiver transducers are shown as wire loops mounted adjacent the delay element, they may also be in coils, or other pattern forms, for example, as discussed in my previous application, the form thereof depending upon the specific use to which the device is put.

The operation of the structure of FIG. 1 can be contrasted with that of the devices in my previously filed application which utilize a single, straight line delay element. As relative motion occurs in the x-direction in FIG. 1, the driver transducer 31 produces an elastic wave which travels along leg 30A towards the bight end of delay element 30 and then returns in the opposite direction along leg 30B. Such wave, when received at the receiver transducer 32, has traveled a distance which is equivalent to substantially twice the distance which is traveled by an elastic wave in the delay elements of such previous device when making a measurement of the same distance $X_0$. Hence, for a continuous wave signal each unit of displacement along the X direction in FIG. 1 creates twice the number of phase cycles than obtained from the readout system of such previous devices. Accordingly, the resolution of the overall system is improved by a factor of two. As is understood, the measurement of such distance by means of coarse and fine readout circuits can be achieved in the same manner as shown in my previously filed application.

While the embodiment of the invention shown in FIG. 1 utilizes continuous wave elastic signals which make two traversals of the distance to be measured, the configurations shown can also utilize pulse signals to measure the time delay thereof from the driver transducer to the receiver transducer, the configuration of the invention providing a higher resolution of the distance measurement than that provided by conventional pulse systems using a single traversal thereof.

Figure 2:
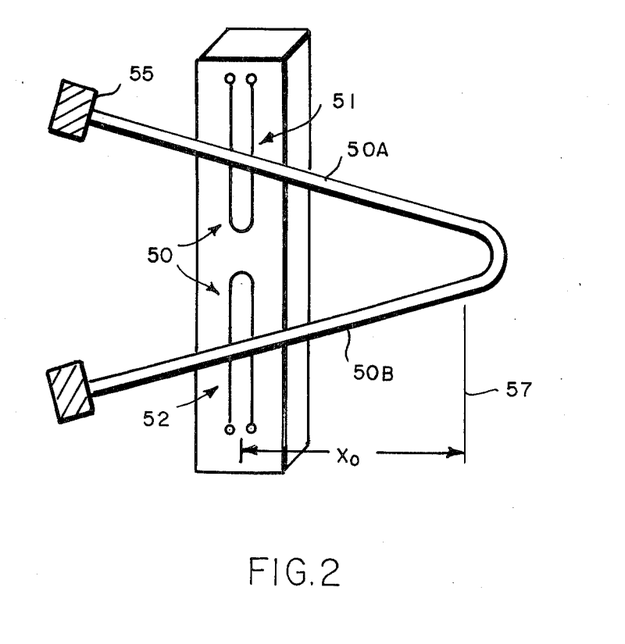
FIG. 2 shows an alternative embodiment of the invention using non-parallel delay elements.

While the configuration of FIG. 1 utilizes a U-shaped delay element wherein the legs of the U are substantially parallel to each other, such configuration may be modified in some applications within the scope of the invention. Thus, as shown in FIG. 2, the delay element 50 may be configured so that its legs 50A and 50B generally converge toward each other from damping blocks 55 with the driver and receiver transducers 51 and 52, respectively, appropriately mounted to move together relative to the delay line towards the converging ends of the legs, or, simultaneously, towards the open ends at mounting blocks 55 thereof in order to measure the distance $X_0$ from transducers 51 and 52 to reference line 57 adjacent the converging ends. In this case, the distance computation must take into account the fact that the distance $X_0$ is the horizontally projected component of the distance along the delay line legs 50A and 50B, which component depends on the angle which said legs make with such horizontal distance.

Figure 3:
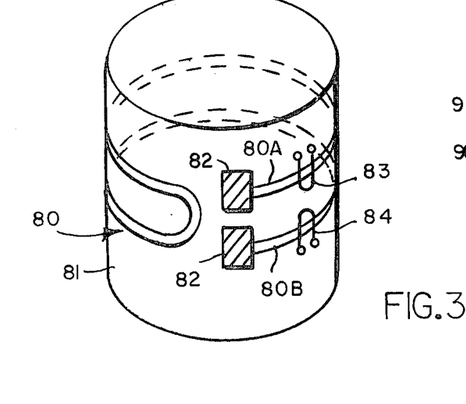
FIGS. 3 and 4 show alternative embodiments of the invention for use with curved signal paths.
Figure 4:
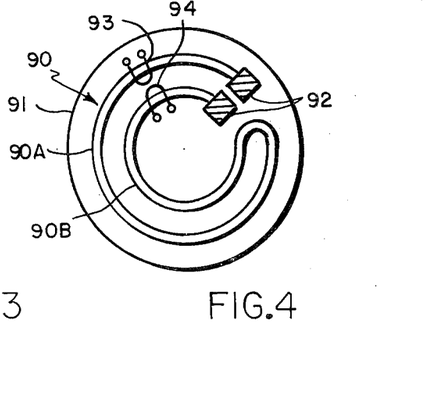

Although the above embodiments disclose "folded" delay lines, the legs of which are straight line delay elements, the same principle is useful for "folded" delay elements which have curved legs, as shown, for example, in the embodiments of FIGS. 3 and 4. In FIG. 3, a delay element 80 is placed on the surface of a cylinder 81, delay element 80 being, in effect, a "folded" line element having damping devices 82 at the ends thereof and a pair of legs 80A and 80B which curve around the surface of cylinder 81. Driver and receiver transducers 83 and 84, respectively, are mounted so that relative motion occurs between the delay element and the transducers, e.g., the cylinder may be moved about its axis and the transducers appropriately mounted on a fixed member, or vice versa. Accordingly, the angular displacement of a position about the cylinder axis can be determined.

A similar curved delay element configuration is shown in FIG. 4 wherein the delay element 90 is placed on a flat surface of a mounting member 91, the delay element being of the folded type and having a pair of curved legs 90A and 90B and the free ends thereof being mounted in damping members 92. Driver and receiver transducers 93 and 94, respectively, are mounted for relative motion with respect to delay element to provide a determination of the angular displacement about the axis of the disk.

When using continuous wave signals for determining the distance $X_0$ in the embodiments of FIGS. 1 and 2, for example, as discussed above, one technique useful in providing coarse and fine readout determination is that disclosed in my previously filed application wherein a step increase in amplitude activates a counter in making the coarse readout. When using such technique with a folded line delay element as described herein, the curvature of the line at the closed end thereof may tend to cause frequency dispersion of the traveling wave such that the step increase in amplitude at the drive transducer becomes distorted when picked up at the receiver transducer so that the exact point of amplitude increase cannot be easily determined to provide an accurate coarse readout.

Figure 5:
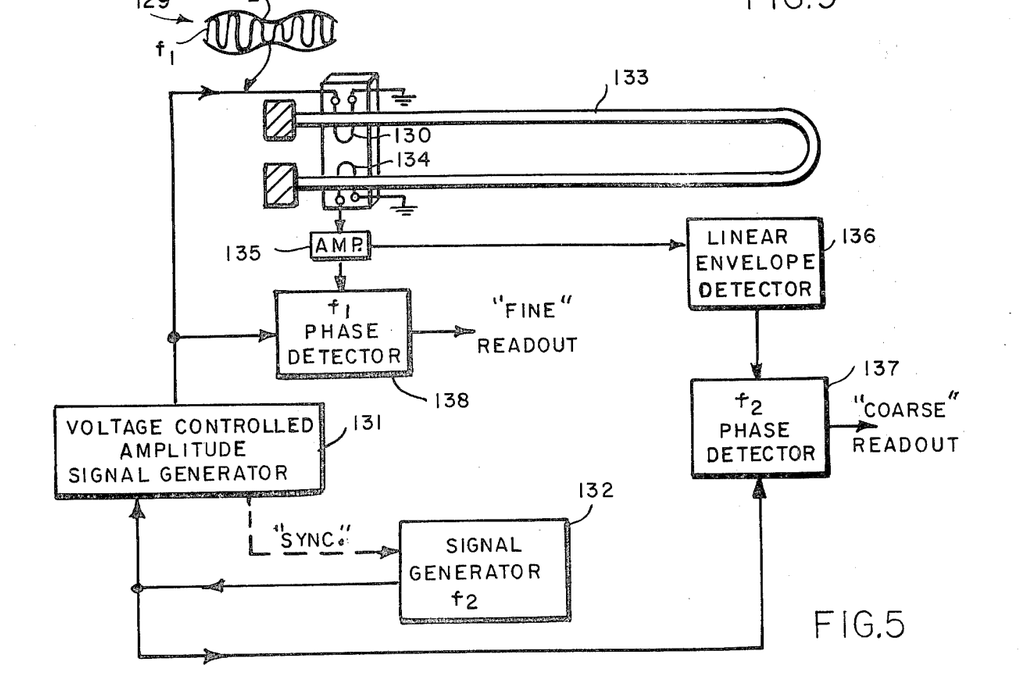
FIG. 5 shows an embodiment of the invention using sinewave amplitude modulated signals for providing coarse and fine readouts.

In order to avoid such problem an alternative measurement system in accordance with that shown in FIG. 5 can be used. As seen therein, an input continuous wave signal 129 having a frequency $f_1$ is supplied to driver transducer 130 from a voltage controlled amplitude signal generator 131. The amplitude of the input signal 129 is modulated by a sinusoidal modulating signal at a lower frequency $f_2$ supplied to the voltage controlled amplitude signal generator by a sinusoidal signal generator 132. The signal generators 131 and 132 are synchronized by an appropriate "sync" signal as shown. Such devices are well known to those in the art and need not be described in more detail here.

The sinusoidally amplitude modulated signal 129 as exemplified by the signal waveform shown in FIG. 5 is supplied to driver transducer 130 to produce a continuous travelling elastic wave signal in folded-line U-shaped delay element 133. The traveling wave signal is received at receiver transducer 134, the received signal being amplified by amplifier 135. The envelope of the amplified signal is detected by a suitable linear envelope detector 136, of any type well known to the art, and the detected envelope signal having a frequency $f_2$ is supplied to a phase detector 137 for phase comparison with the signal from $f_2$ signal generator 132. If the frequency $f_2$ is selected so that the period thereof is greater than the distance to be measured, the phase difference detected at phase detector 137 will provide a "coarse" readout measurement. Since only a single frequency $f_2$ is involved, the frequency dispersion effects occurring at the bend of the U-shaped delay line element 133 can be more easily controlled than in the previously described system wherein the step increase in amplitude, which effectively involves a plurality of frequencies, is subject to distortion due to the frequency dispersion at such bend.

The "fine" readout is obtained by a phase comparison of the received signal of frequency $f_1$ and the driver transducer input signal of frequency $f_1$ at phase detector 138.

Figure 6:
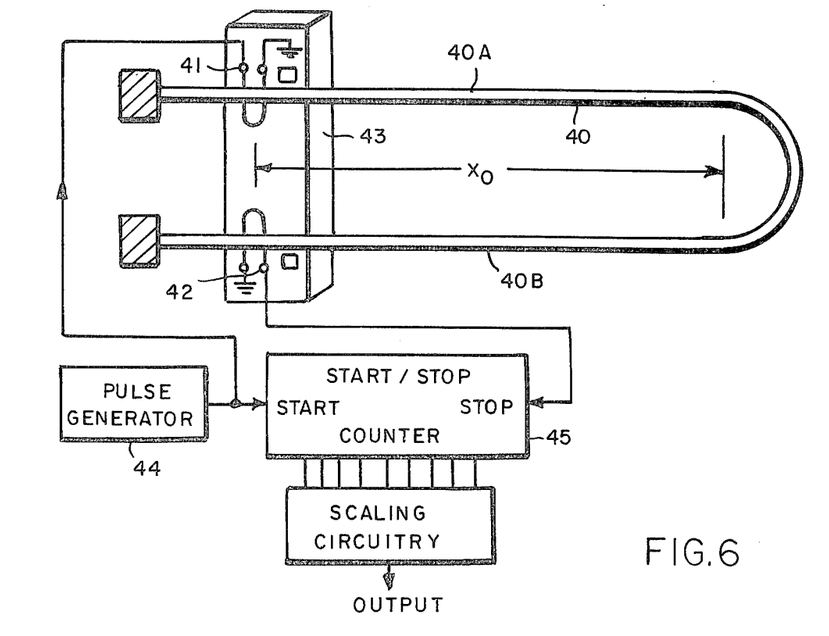
FIG. 6 shows an alternative embodiment of the invention for use with pulse signals.

Another embodiment of the invention for use with pulse signals is shown in FIG. 6 wherein the U-shaped delay element 40 is fixedly mounted with respect to a pair of movable transducers including a driver transducer 41 and a receiver transducer 42 both mounted for simultaneous movement relative to the delay element on a movable member 43 substantially in the manner discussed with reference to similar elements in FIG. 1. A pulse generator 44 provides a driver pulse for activity driver transducer 41 to produce an elastic wave signal in the form of a pulse signal which travels along leg 40A of delay line 40. The driver pulse is also supplied to the "start" input of a time delay counter 45 which thereupon starts its count as the pulse starts its travel along the delay line leg 40A. When the pulse is received at the receiver transducer 42 the received pulse is supplied to the "stop" input of the counter, the count thereof thereby providing an indication of the time of travel of the pulse from driver to receiver. Such time thereupon can be appropriately obtained from the counter and suitably scaled by scalar circuitry in accordance with well-known techniques to produce an output signal representing the distance $X_0$.

Figure 7:
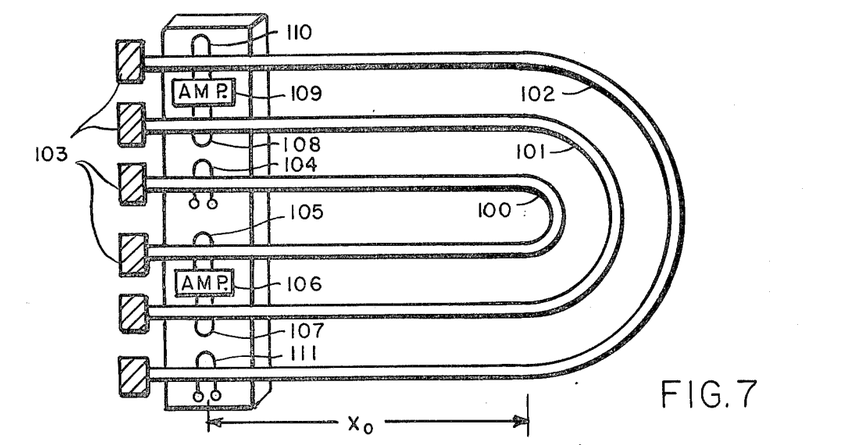
FIG. 7 shows an alternative embodiment of the invention using multiple U-shaped delay elements.

As discussed above, the traveling elastic signal, whether in continuous wave or pulse form, traverses the distance $X_0$ twice in the embodiments of FIGS. 1–6. The distance $X_0$ can be traversed a larger number of times, with a corresponding increase in resolution by the use of a plurality of folded delay like elements as shown in FIG. 7. As seen therein, a plurality of U-shaped folded line elements 100, 101 and 102 are mounted with their free ends in damping blocks 103, as shown. An appropriately excited driver transducer 104 provides a traveling elastic wave signal at delay line 100 which, as discussed above, is picked up by receiver transducer 105 in substantially the same manner as discussed with reference to FIG. 1. The received signal is suitably amplified by amplifier 106 and supplied to a driver transducer 107 at delay line 101. The traveling elastic signal in delay line 101 is picked up by receiver transducer 108 and suitably amplified by amplifier 109 for supply to a driver transducer 110 at delay line 102. The traveling elastic wave signal in delay line 102 is picked up by receiver transducer 111. The phase of the received signal at transducer 111 is compared with the phase of the transmitted signal supplied to transducer 104 as discussed above. Transducers 104, 105, 107, 108, 110 and 111 are mounted to move together in a manner similar to that discussed above with reference to transducers 31 and 32 of FIG. 1.

The delay line signal in the particular embodiment shown in FIG. 7 travels a distance which is effectively equal to six times the distance $X_0$ to be determined and, accordingly, in a manner similar to that discussed with reference to FIG. 1 the resolution is improved by a factor of six over that of a single straight line delay line element system of the devices disclosed in my previous application. Further improvement can be achieved by using additional delay line elements also serially coupled as shown in FIG. 7.

Figure 8:
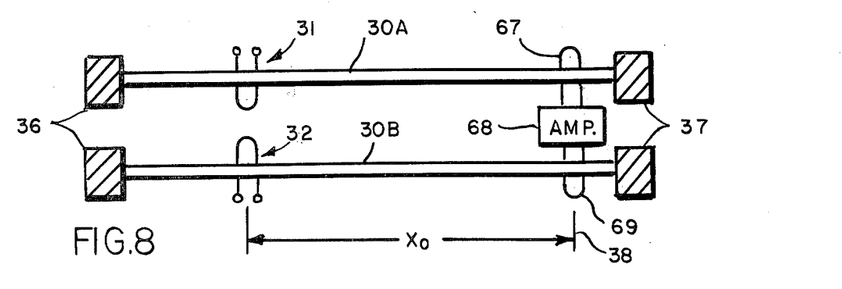
FIG. 8 shows an alternative embodiment of the device of FIG. 2.
Figure 9:
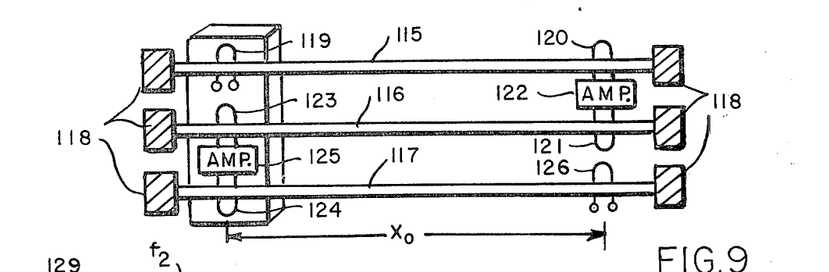
FIG. 9 shows an alternative embodiment of the invention using multiple delay elements.

While the configurations of FIGS. 1–7 are of the "brushless" type, i.e., power is not required to be supplied to one of the two relatively movable members, such devices all utilize mechanical coupling of the signals at the ends of the legs of each of the delay lines involved. Such configurations may be modified to provide for electromagnetic coupling as shown in FIGS. 8 and 9. As can be seen in FIG. 8, in a modification of FIG. 1 the parallel legs 30A and 30B are coupled electromagnetically by means of coupling transducer 67 at leg 30A which picks up a signal from driver transducer 31 and supplies it to amplifier 68 and thence to coupling transducer 69 at leg 30B for travel therein to receiver transducer 32 to the distance $X_0$ from transducers 31 and 32 to a reference line 38. The coupled ends of delay elements 30A and 30B are also mounted in damping blocks 37.

An advantage of the electromagnetic coupling as shown in FIG. 8, for example, lies in the elimination of the curved segment of the mechanically coupled delay line elements, as in FIG. 1, which segment may cause some undesirable standing wave problems at low frequencies which will affect the measurement being made. Moreover, if the delay lines introduce undesired attenuations of the signals traveling therealong, the signal attenuation can be overcome by amplifying the signal which is transferred from one delay line to the other. Further, if pulsed signals are supplied to the delay lines, the pulses may also be re-shaped, as desired, in the electromagnetic coupling elements. On the other hand, as mentioned above, the system of FIG. 8 requires that power be supplied to the coupling elements as well as to the driver transducer, a requirement not necessary in the "brushless" configuration of FIG. 1.

In a similar manner the delay element may have a nonparallel configuration such as that shown in FIG. 2 wherein the mechanical coupling at the end is replaced by an electromagnetic coupling system such as is discussed with reference to FIG. 8. In such a case, in FIG. 2, an additional receiver transducer aligned with reference line 57 would be utilized at leg 50A to pick up the traveling elastic wave signal from transducer 51 for supply to an amplifier which thereupon in turn supplies an amplified signal to an additional driver transducer also aligned with reference line 57 at leg 50B for producing a traveling elastic wave signal along such leg toward receiver transducer 52.

In a similar manner FIG. 9 shows an alternative embodiment for achieving the same resolution improvement as in FIG. 7 using an approach such as that discussed with reference to FIG. 8. In FIG. 9 three delay elements 115, 116 and 117 are mounted adjacent each other in damping blocks 118. A signal is supplied to driver transducer 119 at delay line 115 for travel therealong, which signal is picked up receiver transducer 120. The received signal is supplied to a driver transducer 121 at delay line 116 via amplifier 122 to provide a traveling elastic wave signal which is picked up by receiver transducer 123. The latter signal is thereupon supplied to driver transducer 124 at delay signal 117 via amplifier 125 to provide a traveling elastic signal which is picked up by receiver transducer 126. The signal supplied at transducer 119 and received at transducer 126 traverses the distance $X_0$ three times so that the resolution is improved by a factor of three over that of the devices in my previously filed application. Further improvement can be achieved by using additional delay line elements serially coupled in the same manner as shown in FIG. 9.

Although the invention can effectively use a pulse signal as discussed with reference to FIG. 6, the traveling elastic pulse signal effectively travels a distance equal only to twice the distance $X_0$. In the pulse system shown in FIG. 10, the pulse signal can be caused to traverse the distance $X_0$ a greater number of times in order to improve the resolution even more. Such travel distance is achieved therein by providing a trigger pulse generator 70 which, when initially triggered manually, for example, by start switch 70A, provides an output pulse signal at driver transducer 71 which signal travels along delay line element 72 which is mounted at its ends in damping blocks 73. The traveling pulse signal is picked up by receiver transducer 74 and is thereupon appropriately amplified at amplifier 80 and supplied to the trigger input of trigger pulse generator 70 via threshold detector 81 and AND gate 75 as explained more fully below to trigger a second pulse signal for driver transducer 71. The second pulse signal also travels along delay line 72 and triggers a third pulse signal, and so forth, until the operation is subsequently stopped as discussed below.

Figure 10:
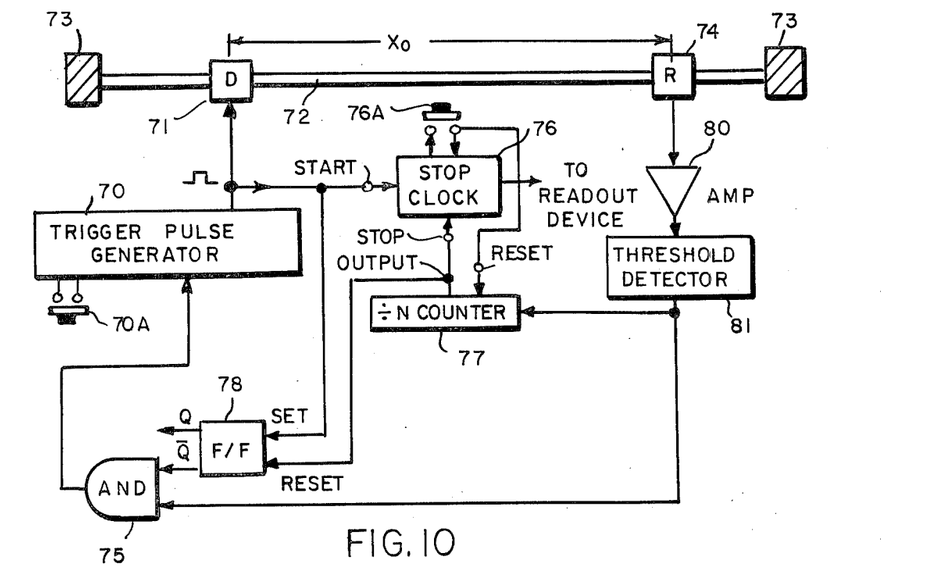
FIG. 10 shows an alternative embodiment of the invention for use with pulse signals.

In effect the signal loop of FIG. 10 provides a positive feedback operation for the overall device thereby providing an effective pulse train oscillator. The time of travel of the series of successive pulses along delay element 72 being representative of the distance $X_0$ between the transducers 71 and 74.

In the specific operation of the pulse system of FIG. 10, a reset switch 76A is activated to clear (i.e., to reset) a start-stop clock 76 and $a \div N$ counter 77, prior to the momentary activation of start switch 70A which triggers the first pulse provided by pulse generator 70. The initial pulse thereupon generated by pulse generator 70 excites driver transducer 71 and simultaneously starts clock 76 and sets a flip-flop circuit 78. When set, the O output of flip-flop 78 produces a "1" output signal, for example, which is supplied to AND gate 75 (when reset, the flip-flop O output is a "0").

A pulse signal thereupon travels along the delay line element 72 and its presence is subsequently picked up by receiver transducer 74 whereupon it is amplified and suitably reshaped by amplifier 80 and threshold detector circuit 81. The amplified/re-shaped pulse thereupon is supplied to pulse generator 70 via AND gate 75, so long as the latter is set. Such signal thereby again triggers the pulse generator which thereupon supplies a second pulse signal to driver transducer 71. The output of threshold detector 81 activates the $\div N$ counter 77 at the same time. The second pulse signal similarly triggers a third pulse at generator 70, and so on.

After N cycles, i.e. when N pulses have been supplied by pulse generator 70 and received by receiver transducer 74, the $\div N$ counter produces an output signal which thereupon is supplied to the stop input of clock 76 to stop the clock. Simultaneously, the output of $\div N$ counter 77 supplies a re-set pulse to flip-flop circuit 78 to effectively "close" AND gate 75 and prevent any further triggering of pulse generator 70. The time interval measured by clock 76 is representative of the distance $X_0$ between the driver transducer 71 and the receiver transducer 74, the clock output signal being applied to an appropriate read-out device for determining such distance from a knowledge of the scale factor N. In determining such distance the time delays associated with the electronic equipment must be suitably taken into account, e.g., the time required to trigger the pulse generator, the time delay incurred in re-shaping the pulse, and the like.

The resolution of the position determining system shown in FIG. 10 is a function of the frequency of the start-stop clock 76 and of the number of pulses N that have traveled along delay line element 72 (an operation which can be thought of as equivalent to having the same pulse travel the distance $X_0$ along the delay line N times, analogous to the device of FIG. 1 wherein a continuous wave signal travels the distance $X_0$ twice). For a selected value of N, the measured time interval is determined by the propagation delay times N plus the time delay introduced by the electronic components of the system times N. The latter can be a known factor and can be taken into account in the distance calculation as an effectively constant bias for the given factor N.

The advantage of the multi-pulse technique shown in FIG. 10 as compared to FIG. 6, for example, is that improved resolution can be obtained, as determined by the factor N, without the need for a high speed clock. Thus, for example, a 20 MHz start-stop clock 76 can provide a resolution to within 0.010 inches when used with a nickel magnetostrictive delay line element and 200 MHz clock to within 0.001 inches. In most practical applications, the longer time required to make the measurement, as compared to the use of a continuous wave signal, does not represent a significant disadvantage since the velocity of sound in magnetostrictive materials, for example, is high (about 15 times that in air) and positive determinations can be made of relatively slow moving transducers, the pulse being capable of recycling a sufficient number of times to provide high resolution before the transducer has moved significantly from its original position when the measurement was begun at the triggering of the initial pulse. The factor N can be selected by any desirable value greater than unity depending on the application and resolution needs of the user. Other time interval measurement techniques within the skill of the art can also be used to improve the resolution further, e.g. various interpolation techniques for interpolating within a clock interval.

A positive feedback pulsing system of the type shown in FIG. 10 can also be used to provide a multi-path circulating pulse signal in the folded delay line configuration of FIG. 6 to provide even further improved resolution of twice that achieved with the system shown in FIG. 10.

Figure 11:
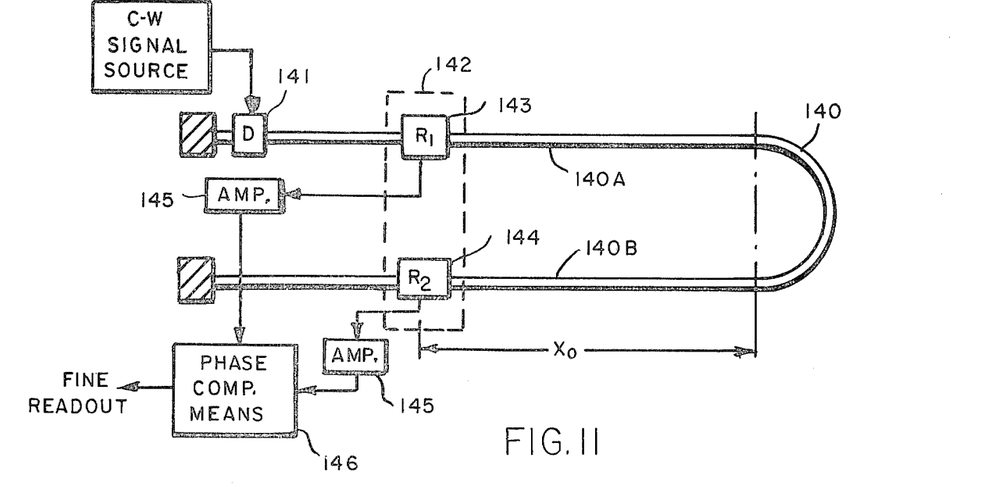
FIG. 11 shows a further alternative embodiment of the device of FIG. 1.

A further alternative embodiment of the invention is shown in FIG. 11 which represents an alternative technique used, for example, with a folded delay line element as shown in FIG. 1. In the latter system the driver and receiver transducers 31 and 32 are mounted relatively near to each other on movable means 33. In such an arrangement the receiver transducer 32 may pick up both the traveling elastic wave signal propagated along delay line element 30 as well as an air-borne signal directly received from driver transducer 31 because of its position in near proximity thereto. The latter signal will interfere with ability of the system to detect the traveling elastic wave signal for phase comparison purposes.

In order to avoid such problem, it is necessary that the transducers not be mounted too close to each other and that appropriate electrical shielding be provided between the transducers. Such a structure thereby cannot be made in as compact a fashion as may be desired, or required, in some applications.

The embodiment of FIG. 11 overcomes such problems and, as can be seen therein, a U-shaped delay line element 140 has a driver transducer 141, also identified as transducer D, fixedly mounted with respect to delay line element 140 at an appropriate location near one end of leg 140A thereof. A pair of receiver transducers 143 and 144, also identified as transducers $R_1$ and $R_2$, are mounted on a suitable movable means 142 so as to move together with respect to delay line element 140, transducer 143 moving adjacent leg 140A thereof and transducer 144 moving adjacent leg 140B thereof.

When the driver transducer 141 is appropriately excited, a traveling elastic wave is propagated along delay line leg 140A and its presence is initially picked up by the first receiver transducer 143. The traveling wave continues to travel along delay line element 140 until it is subsequently picked up by the second receiver transducer 144 at leg 140B thereof. The outputs of the receiver transducers are then supplied to appropriate amplifiers 145 and phase comparison means 146 to provide the required coarse and fine position readout signals for determining the distance $X_0$, as disclosed above.

In the system of FIG. 11, the receiver transducers are not mounted near the shielded driver transducer and the need for carefully shielding the receivers is lessened. Moreover, the receiver transducers can be mounted very close to each other on an appropriate movable means without causing any serious signal interference problems since neither acts as a driver transmitter. The overall arrangement can thereby be packaged in a more compact manner than is possible in the configuration of FIG. 1. It is clear also that such an arrangement can also be appropriately adopted for use in the other embodiments of the invention which are discussed above.

Figure 12:
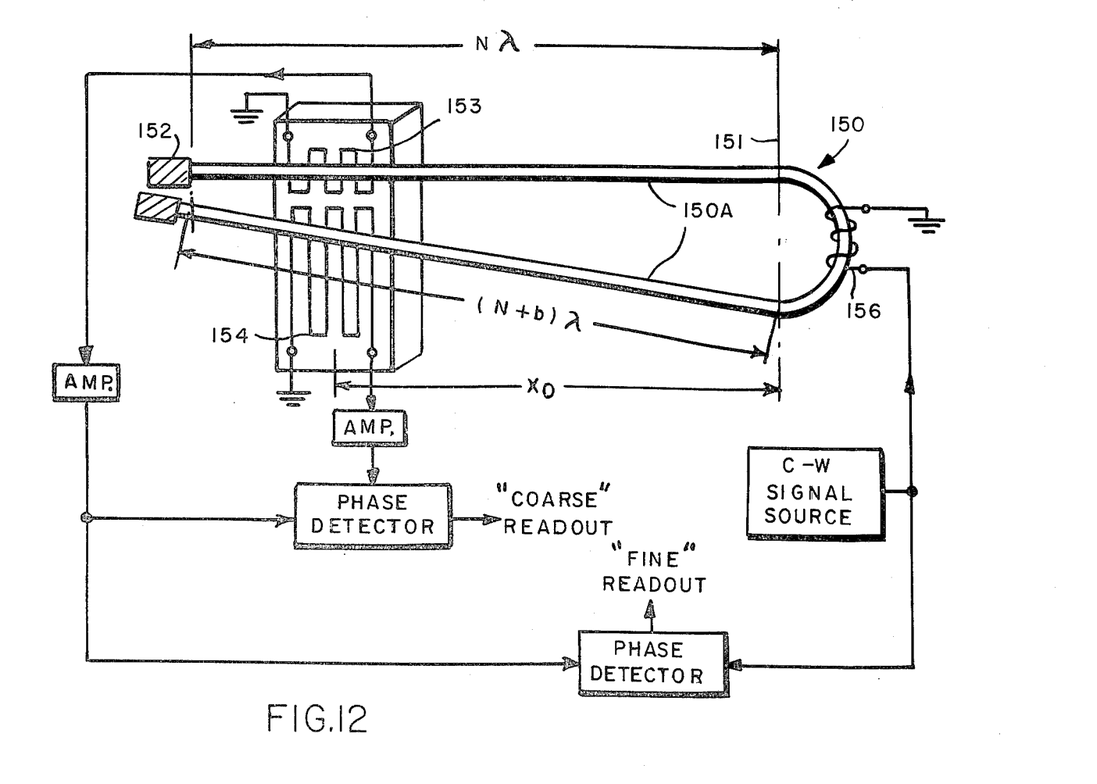
FIG. 12 shows an embodiment of the invention using a U-shaped delay element to obtain coarse and fine readout for CW signals in a simplified manner.

An alternative use of a folded delay line for providing a method of producing coarse and fine readouts when making phase comparisons using continuous wave signals which is much simpler to implement than the method discussed in my previously filed application or that discussed with reference to FIG. 5 herein. Such alternative technique is shown in FIG. 12 wherein a folded delay line element 150 has a first leg 150A and a second, non-parallel leg 150B, the length of leg 150B being greater than that of leg 150A. Thus, if leg 150A has a length $N\lambda$ (where N is a whole number and $\lambda$ is the wavelength of the continuous wave signal) along a direction parallel to leg 150A from the reference line 151 to its termination block 152, the leg 150B has a corresponding length $(N + b)\lambda$, as shown. A pair of receiver transducers 153 and 154 are mounted on a movable member 155 so as to move simultaneously with respect to delay line element 150, along a direction parallel to leg 150A thereof. The transducers may have a preselected square wave pattern, for example, as shown. A driver transducer 156 is fixedly mounted with respect to the delay line element 150 near the mechanically coupled end thereof at the reference line 151. A continuous wave signal source supplies a driver signal to driver transducer which causes continuous elastic wave signals to be propagated along each of the delay line legs 150A and 150B toward receiver transducers 153 and 154. The phase of the signal picked up at receiver transducer 154 is compared with the phase of the signal picked up at receiver transducer 153 to provide a coarse readout representing the distance $X_0$. The phase of the signal at receiver transducer 153 is also compared with that of the driver signal supplied to driver transducer 156 to provide a fine readout signal representing the distance $X_0$.

In the configuration of FIG. 12, if $b = 0$ the legs 150A and 150B are effectively parallel and no coarse readout can be obtained by this method since the phases at the receiver transducer will always be equal. However, if $b = 1$, as the movable member 155 moves from a position adjacent termination blocks 152 to the reference line 151, the phase difference between the receiver transducer signals will vary over a 360° range, the measured phase difference thereby permitting the position of the receiver transducers to be determined to within one wavelength of the continuous wave driver signal, i.e. a "coarse readout". The phase difference between the received signal at transducer 153 and the driver signal provides, as before, the required fine readout signal.

The factor $b$ can also be set at a value less than 1, is desired, (i.e., $0 < b \leq 1$) and so long as such value is known the required coarse readout can be obtained. Measurements provide direct readout information, i.e., information directly corresponding to the distance being measured, so that the data processing required to attain the desired distance information is greatly simplified.

Figure 13:
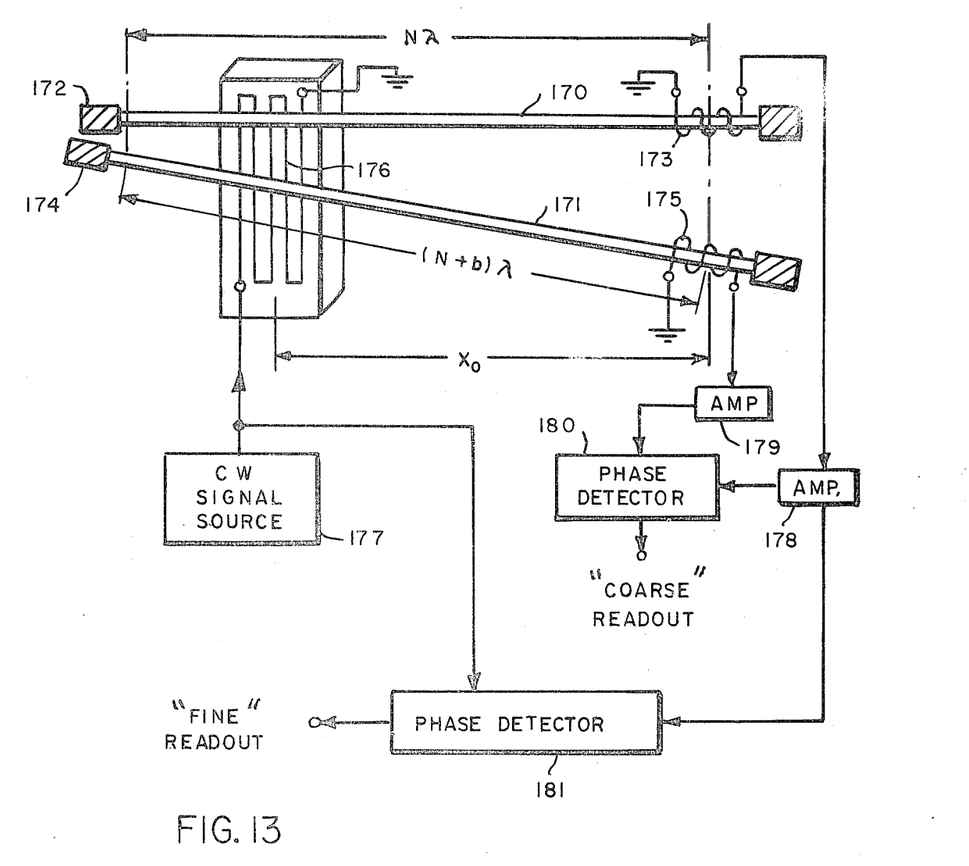
FIGS. 13–15 show modifications of the embodiment of FIG. 12.

A modification of the embodiment of FIG. 12 is shown in FIG. 13 wherein two separate non-parallel delay line elements 170 and 171 are utilized. The length of delay line 170 from mounting block 172 to a first receiver transducer 173 fixedly mounted on the delay line being $N\lambda$ and the length of delay line 171 from mounting block 174 to a second receiver 175 fixedly mounted on the delay line being $(N + b)\lambda$, similar to the embodiment of FIG. 12. A driver transducer 176 is movably mounted with respect to the delay lines and the receiver transducers so as to move along a direction parallel to delay line 170. The driver transducer may have a preselected square wave pattern, for example, as shown.

The driver transducer 176 produces continuous wave signals in both delay lines 170 and 171 which are propagated along each of the delay lines toward receiver transducers 173 and 175, respectively. The driver transducer is supplied with a signal from a continuous wave signal source 177. Appropriate amplifiers 178 and 179 for the received signals and a phase detector 180 provide a "coarse" readout signal and phase detector 181 supplied with the received signal from amplifier 178 and the continuous wave signal from source 177 provides a "fine" readout signal. In such embodiment each of the fixedly mounted receiver transducers can be easily shielded and a good signal to noise ratio can be achieved.

Figure 14:
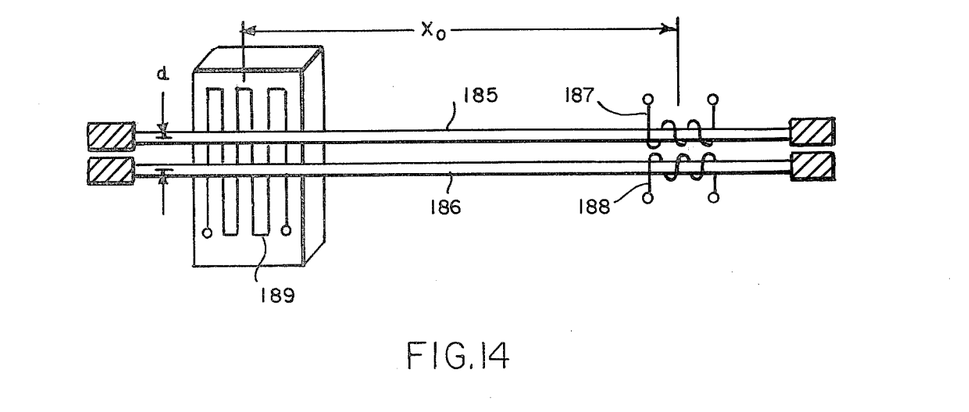

In a further modification of the invention, the embodiment of FIG. 14 can be used wherein a pair of parallel delay line elements 185 and 186 each have a receiver transducer 187 and 188, respectively, fixedly mounted thereon. A driver transducer 189 in the form of a preselected square wave pattern, for example, is movably mounted with respect to the delay lines and receiver transducers to move along a direction parallel thereto. Delay line 185 is made of a first material, and as hard, or non-annealed, nickel, whereby signals are propagated thereby at a first velocity of propagation "$C_1$", while delay line 186 is made of a different material, such as annealed nickel, whereby signals are propagated therealong at a second different velocity of propagation "$C_2$". The materials are selected so that the velocities $C_1$ and $C_2$ are sufficiently different to provide for at least one wavelength $\lambda$ difference between the two delay lines all along their lengths so as to produce unambiguous distance information. Although not shown specifically, coarse and fine readouts can be obtained as above in FIGS. 12 and 13 by determing the phase differences between the received signals and between the driver signal and the received signal at receiver transducer 187, respectively.

By the use of the embodiment shown in FIG. 14, the distance "$d$" between the delay lines can be minimized to save space in many applications, in contrast to the embodiments of FIGS. 12 and 13.

Figure 15:
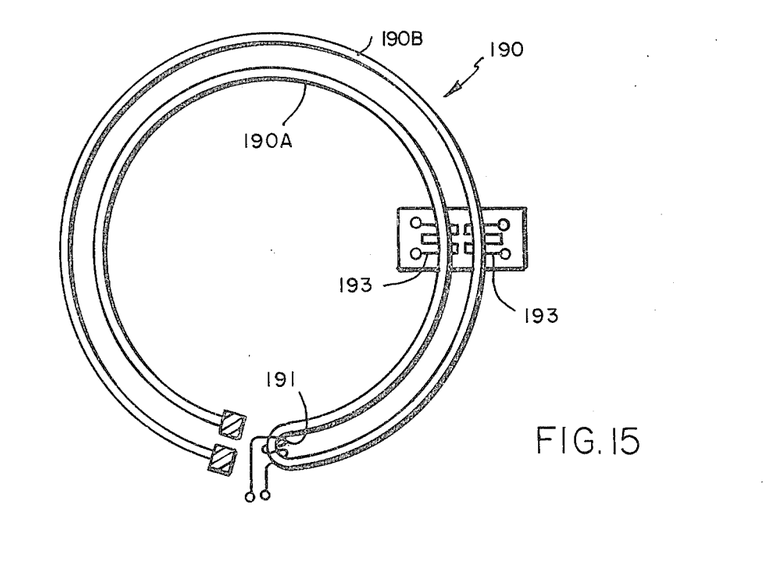

In a still further modification of the principles used in FIGS. 12 and 13, FIG. 15 shows a curved delay line element 190 which has a first inner leg 190A and a second outer leg 190B, the legs being effectively parallel and concentric. Accordingly, the length of inner leg 190A is shorter than that of outer leg 190B, such lengths being arranged as $N\lambda$ and $(N + b)\lambda$, respectively. In a manner similar to FIG. 12, a driver transducer 191 is fixedly mounted near the mechanically coupled end of delay line 190 and a pair of receiver transducers 192 and 193 are movably mounted with reference to the delay line and driver transducer so as to move along a curved path parallel to that formed by the delay line. Appropriate phase comparison circuitry (not shown) similar to that shown in FIG. 12 can be used to provide coarse and fine readout measurements.

In using the delay elements of the invention, variations in temperature may produce errors in the measurements involved due to changes in the phase propagation velocity of the acoustic wave which travels along the line was well to changes in the length of the line as a function of temperature changes. Error due to length variations are of less significance than phase velocity errors and the length changes can be relatively easily compensated for by mounting the delay line in a non-rigid manner at its ends so that increases in length do not vary the "active" length of the delay line, so that the direction of the delay lines does not change, and hence, the characteristics of the acoustic traveling wave signal do not change as the delay line expands or contracts.

Figure 16:
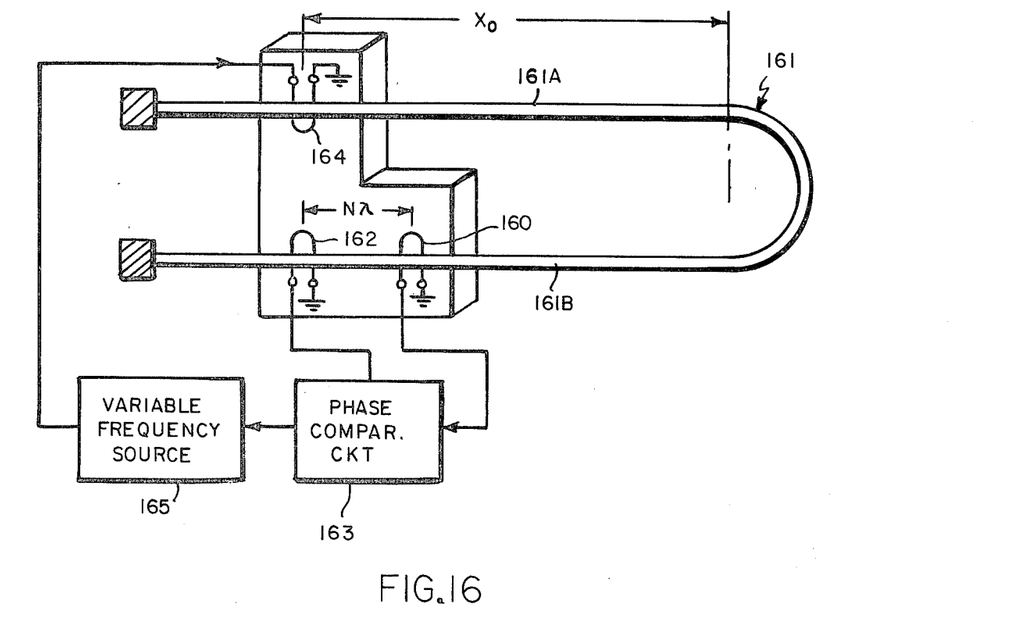
FIGS. 16 and 17 show embodiment of the invention for providing temperature compensation.
Figure 17:
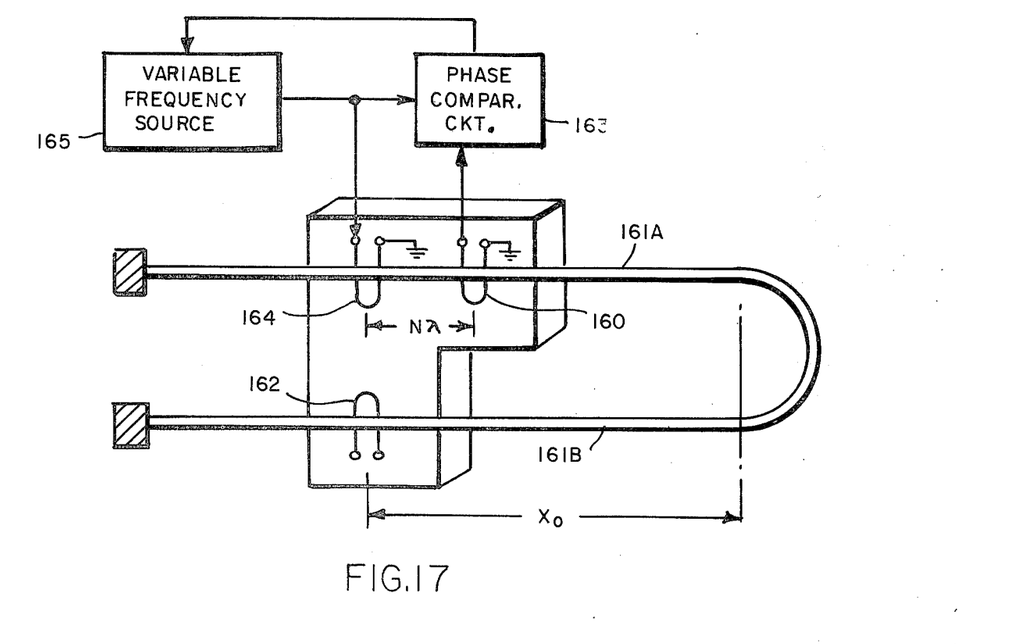

Phase velocity errors can be compensated, for example, in the folded delay line configuration as shown in FIGS. 16 or 17. In FIG. 16, for example, a reference transducer 160, such as a reference pickup coil, is coupled to one leg of 161B of the folded delay line 161 at a fixed distance, $N\lambda$, for example, from the receiver transducer 162. A comparison is made of the differences between the phase of the reference signal picked up at transducer 160 and the phase of the received signal at transducer 162 in a phase comparison circuit 163 which produces an output signal which is used as a frequency control signal for a variable frequency source 165, such as a voltage controlled oscillator (VCO), to change the frequency of the input signal to driver transducer 164, thereby effectively changing the phase of such input signal so as to reduce said phase difference to zero. In this way, even in view of temperature variations, the phase velocity can be maintained substantially constant by appropriately controlling the frequency of the input signal.

FIG. 17 shows an alternative embodiment thereof wherein the reference transducer is positioned to couple to leg 161A of folded delay line 161 at a fixed distance from the driver transducer 164 and the phase difference between the input signal to driver transducer 164 from the signal VCO signal source 165 and the signal picked up by reference transducer 160 are compared at phase comparison circuit 163 to produce a frequency control signal for variable frequency source 165 in the same manner described above with reference to FIG. 16.

While in many embodiments the signals are coupled to and from the delay lines electromagnetically, such signals can be coupled mechanically, for example, when used with delay lines capable of supporting mechanical elastic waves, such as with piezoelectric delay line elements, for example. Further, in those embodiments in which two phase detectors are shown as utilized in producing the coarse and fine readouts, it may be desirable in some applications to use only a single phase detector which is arranged so that its phase detecting functions are time multiplexed, only suitable and well known switching techniques, to provide both of the required readouts at different times in sequence. Other modifications of the folded delay element technique described herein within the scope of this invention will occur to those in the art and the invention is not to be limited to the particular embodiments shown and discussed herein, except as defined by the appended claims. For example, the position readout device of the invention can be used to derive velocity information from the distance measurement techniques described herein or the distance measurements can be used in position control systems, such as in machine tool control systems. Further, other coarse and fine readout techniques which are known in the art as, for example, cycle counting techniques, and the like, can be used in the embodiments of the invention as described herein.

The following patents and publications, known to the applicant, are herewith set forth as exemplary of the prior art and are made of record in this application:

| U.S. Pat. No. | |
| --- | --- |
| 2,863,121 | 3,428,789 |
| 2,947,929 | 3,491,453 |
| 3,008,087 | 3,534,609 |
| 3,016,498 | 3,641,429 |
| 3,121,955 | 3,648,277 |
| 3,134,099 | 3,717,033 |
| 3,140,612 | 3,898,555 |
| 3,156,766 | 3,936,765 |
| 3,172,075 | |
| 3,271,763 | |

-continued

U.S. Pat. No.

Foreign Patents
British Pat. No. 1,035,763

"Optimal Harmonic Reduction In Periodic Switched Wave Forms", James F. Rhodes, C.S. Draper Laboratory Report T-527, January 1970.
"A Simple Method of Increasing Magnetostriction Signals in Spark Chambers with Magnetostrictive Readout" - V. Bohmer et al., Nuclear Instruments and Methods 96 (1971), pages 601–603.
"Magnetostrictive Readout for 'Wire Spark Chambers'" - V. Perex-Mendex et al., Nuclear Instruments and Methods 33 (1965), pages 141–146.
"Construction and Performance of Large Wire Spark Chambers with Magnetostrictive Read-out" - G. Grayer et al., Nuclear Instruments and Methods 99 (1972), pages 579–587.
"Accurate Measurements of the Electrical Length of Long Coaxial Radio Frequency Cables" (Winn-Williams), Proc. IEEE, Vol. 19, No. 2, February 1972.
"Surface-Acoustic-Wave Delay-Line Controlled Low-Frequency Oscillators" (S. Pookaiyaudom), Proc. IEEE, July 1975, pages 1071, 1072.

What is claimed is:

1. A position determining system comprising
at least one delay element capable of supporting a traveling wave signal;
signal producing means;
at least one driver transducer means located at at least one position at said delay element;
at least one receiver transducer located at at least one other position of said delay element;
said driver transducer means being responsive to said signal producing means for causing a traveling wave to propagate along said delay element from said at least one position to said at least one other position so that said traveling wave signal traverses a distance to be measured more than once;
means responsive to the signal at said at least one driver transducer means and the signal received at said at least one receiver transducer means for determining the distance between a reference position fixed with respect to said delay element and the position of one of said driver transducer means or receiver transducer means; and
means for substantially reducing reflections of said traveling wave signal in said delay element.

2. A system in accordance with claim 1 wherein said delay element is arranged to provide at least two separate delay paths for said traveling wave signal.

3. A system in accordance with claim 2 wherein said delay element is in the form of at least one substantially U-shaped delay element having two legs coupled together at one end of each of said legs.

4. A system in accordance with claim 3 wherein said legs are mechanically coupled together.

5. A system in accordance with claim 4 wherein said driver transducer means and said receiver transducer means are arranged to move together relative to the legs of said at least one delay element.

6. A system in accordance with claim 5 wherein the legs of said at least one delay element are substantially parallel.

7. A system in accordance with claim 6 wherein the legs of said at least one delay element have a substantially straight line configuration.

8. A system in accordance with claim 6 wherein the legs of said at least one delay element have a substantially circular configuration.

9. A system in accordance with claim 5 wherein the legs of said at least one delay element are non-parallel.

10. A system in accordance with claim 9 wherein the legs of said at least one delay element each has a substantially straight line configuration.

11. A system in accordance with claim 5 wherein said at least one delay element includes a plurality of delay elements, a first one of said delay elements including
at least one driver transducer means responsive to said signal producing means for causing a traveling wave signal to propagate along said first delay element; and
at least one receiver transducer means for detecting the presence of said traveling wave in said first delay element;
a plurality of additional delay elements each including
at least one driver transducer means responsive to the signal at said at least one receiver transducer means of an adjacent delay element for causing a traveling wave to be propagated in each of said additional delay elements from its driver transducer means to a receiver transducer means thereof; and at least one of said delay elements including
at least one driver transducer means responsive to the signal at the at least one receiver transducer means of the one of said additional delay elements adjavent thereto for causing a traveling wave signal to propagate in said last one of said delay elements; and
at least one receiver transducer means for detecting the presence of said traveling wave signal in said last delay element;
all of the driver transducer means and receiver transducer means of said first, said additional and said last delay elements being arranged to move together relative to said delay elements.

12. A system in accordance with claim 11 and further including amplifying means for amplifying a received signal at each delay element except said last delay element and for supplying said amplified signal to the driver transducer means of the delay element adjacent thereto.

13. A system in accordance with claim 3 wherein said legs are electromagnetically coupled together.

14. A system in accordance with claim 13 wherein said at least one driver transducer means and said at least one receiver transducer means are arranged to move together relative to the legs of said at least one delay element.

15. A system in accordance with claim 14 wherein the legs of said at least one delay element are substantially parallel.

16. A system in accordance with claim 15 wherein the legs of said at least one delay element have a substantially straight line configuration.

17. A system in accordance with claim 16 wherein the legs of said at least one delay element have a substantially circular configuration.

18. A system in accordance with claim 14 wherein the legs of said at least one delay element are non-parallel.

19. A system in accordance with claim 18 wherein the legs of said at least one delay element each has a substantially straight line configuration.

20. A system in accordance with claim 14 wherein said at least one delay element includes a plurality of delay elements, a first one of said delay elements including
at least one driver transducer means responsive to said signal producing means for causing a traveling wave signal to propagate along said first delay element; and at least one receiver transducer means for detecting the presence of said traveling wave in said first delay element;

a plurality of additional delay elements each including at least one driver transducer means responsive to the signal at the at least one receiver transducer means of an adjacent delay element for causing a traveling wave to be propagated in each of said additional delay elements from its at least one driver transducer means to the at least one receiver transducer means thereof; and at least one of said delay elements including at least one driver transducer means responsive to the signal at the at least one receiver transducer means of the one of said additional delay elements adjacent thereto for causing a traveling wave signal to propagate in said last one of said delay elements; and at least one receiver transducer means for detecting the presence of said traveling wave signal in said last delay element;

all of the driver transducer means and receiver transducer means of said first, said additional and said last delay elements being arranged to move together relative to said delay elements.

21. A system in accordance with claim 20 and further including amplifying means for amplifying a received signal at each delay element except said last delay element and for supplying said amplified signal to the at least one driver transducer means of the delay element adjacent thereto.

22. A system in accordance with claim 3 wherein one of said two legs is longer than the other of said two legs and further wherein said at least one receiver transducer means comprises at least one pair of receiver transducers arranged for detecting the presence of a traveling wave in each of said legs.

23. A system in accordance with claim 22 wherein the length of one of said legs is $N\lambda$ where $N$ is a whole number and $\lambda$ is the wavelength of a continuous elastic wave propagated along the legs of said delay element and the length of the other leg is $(N + b)\lambda$ where $b$ is a number greater than zero but less than or equal to 1.0.

24. A system in accordance with claim 23 and further wherein said at least one driver transducer means is fixedly mounted relative to said delay element; and said at least one pair of receiver transducers are arranged to move together relative to said delay element along a direction substantially parallel to the direction of one of said legs of said delay element.

25. A system in accordance with claim 23 and further wherein said at least one pair of receiver transducers are fixedly mounted relative to said delay element; and said at least one driver transducer means is arranged to move relative to said delay element along a direction substantially parallel to the direction of one of said legs of said delay element.

26. A system in accordance with claim 2 wherein the length of said legs are equal and the velocity of propagation of a traveling wave signal in one of said legs is different from the velocity of propagation of a traveling wave signal in the other of said legs.

27. A system in accordance with claim 26 wherein said legs are made of different materials selected so that said different velocities of propagation provide at least one wavelength difference between the two legs all along their lengths.

28. A system in accordance with claim 1 wherein said signal producing means is a pulse signal source capable of supplying a plurality of pulse signals to said at least one driver transducer means whereby a traveling pulse signal is propagated along said delay element more than once.

29. A system in accordance with claim 28 wherein said delay element is a single delay line element; and further including means responsive to each pulse signal detected at said receiver transducer means for triggering said pulse signal source to supply said plurality of pulse signal to said at least one driver transducer means for propagation along said delay element so that a pulse signal traverses the distance to be measured more than once; and further wherein said distance determining means measures the times of travel of said plurality of pulse signals for determining said distance.

30. A system in accordance with claim 1 wherein signal producing means provides a continuous wave signal to said at least one driver transducer means where a continuous traveling wave signal is propagated along said delay element and further wherein said distance determining means includes means for comparing the phase of the continuous wave signal supplied to said at least one driver transducer means with the phase of the signal received at said at least one receiver transducer means.

31. A system in accordance with claim 30 wherein said signal producing means includes means for providing an amplitude modulated continuous wave signal comprising a carrier signal having a first frequency, which carrier signal is amplitude modulated by a modulating signal having a second frequency; and further wherein said phase difference measuring means includes means for demodulating the signal received at said at least one receiver transducer means to produce a detected signal representing the envelope of said received signal;

means for comparing the phase of said detected signal with the phase of said modulating signal to produce a coarse determination of the distance to be measured; and means for comparing the phase of said carrier signal supplied to said at least one driver transducer means with the phase of the carrier signal of the received signal at said at least one receiver transducer means to produce a fine determination of the distance to be measured.

32. A system in accordance with claim 2 wherein said at least one receiver transducer means comprises at least one pair of receiver transducers for detecting the presence of a traveling wave in each of said paths, said at least one driver transducer means being fixedly mounted relative to said delay element and said at least one pair of receiver transducers being arranged to move together relative to said delay element; and said distance determining means includes means for comparing the phase of the signal received at one of said at least one pair of receiver transducers with the phase of the signal received at the other of said at least one pair of receiver transducers to produce a coarse determination of the distance to be measured; and means for comparing the phase of the signal supplied at said at least one driver transducer means with the signal received at said one of said at least one pair of receiver transducers to produce a fine determination of the distance to be measured.

33. A system in accordance with claim 2 wherein said at least one receiver transducer means comprises at least one pair of receiver transducers for detecting the presence of a traveling wave in each of said paths, said at least one pair of receiver transducers being fixedly mounted relative to said delay element and said at least one driver transducer means being arranged to move relative to said delay element; and said distance determining means includes means for comparing the phase of the signal received at one of said at least one pair of receiver transducers with the phase of the signal received at the other of said at least one pair of receiver transducers to produce a coarse determination of the distance to be measured; and means for comparing the phase of the signal supplied at said at least one driver transducer means with the signal received at said one of said at least one pair of receiver transducers to produce a fine determination of the distance to be measured.

34. A system in accordance with claim 1 and further including means for compensating for errors in determining said distance which errors arise due to phase velocity errors to which said apparatus is subjected.

35. A system in accordance with claim 34 wherein said error compensating means includes at least one other transducer means coupled to said delay element at a preselected position which is a preselected distance from said at least one receiver transducer means for detecting the presence of said traveling wave signal as it travels past said preselected position; and means responsive to the detected traveling wave signal at said preselected position for controlling the phase of the signal from said signal producing means so as to compensate for said phase velocity errors.

36. A system in accordance with claim 34 wherein said error compensating means includes at least one other transducer means coupled to said delay element at a preselected position which is a preselected distance from said at least one driver transducer means for detecting the presence of said traveling wave signal as it travels past said preselected position; and means responsive to the detected traveling wave signal at said preselected position for controlling the phase of the signal from said signal producing means so as to compensate for said phase velocity errors.

* * * * *